United States Patent Office 3,793,281
Patented Feb. 19, 1974

3,793,281
THERMOPLASTIC COPOLYIMIDES
Luis Acle, Jr., San Diego, Calif., assignor to International Harvester Company, San Diego, Calif.
No Drawing. Continuation-in-part of application Ser. No. 88,510, Nov. 10, 1970, which is a division of application Ser. No. 835,226, June 20, 1969, both now abandoned. This application July 14, 1972, Ser. No. 272,034
Int. Cl. C08g 20/32
U.S. Cl. 260—2.5 N          32 Claims

ABSTRACT OF THE DISCLOSURE

Aromatic thermoplastic copolyimides made from a 3,3′,4,4′-benzophenonetetracarboxylic acid derivative and two or more aromatic diamines, at least one of which is meta-substituted and both or all of which are either meta- or para-substituted, together with precursors for and methods of preparing and using such copolyimides and precursors.

---

This application is a continuation-in-part of application No. 88,510 filed Nov. 10, 1970, which is a division of application No. 835,226 filed June 20, 1969. Applications Nos. 88,510 and 835,226 are now abandoned.

The present invention relates to aromatic copolyimides and, more particularly, to aromatic copolyimides which have the useful properties of previously known polyimides, but which are thermoplastic and can accordingly be formed into useful articles by the techniques employed for forming other thermoplastic materials.

Aromatic polyimides are extremely valuable materials because of their chemical inertness, strength, resistance to extremely high temperatures, etc. However, aromatic polyimides have not been widely employed because those heretofore known cannot be fabricated using thermoplastic forming technology. As a result of this characteristic, they can be shaped into useful articles only by a limited number of techniques, all of which are comparatively expensive in relation to those by which thermoplastic materials can be fabricated.

An attempt has been made to solve this problem of intractability by forming an aromatic homopolyimide via a reaction in which an aromatic dianhydride and an aromatic diamine are reacted at a high temperature in an inert solvent and in the presence of a tertiary amine catalyst.[1]

This procedure purportedly produces a molding powder which can be coalesced at a temperature below the crystalline melting point of the polyimide.

However, it is admitted in the gall patent that coalescence of the molding powder so produced requires pressures of 2,000 to 30,000 p.s.i. Since the presses now commercially available are capable of producing pressures only up to 2,000 p.s.i., such materials have little practical value. Moreover, the procedure by which they are made would make them too expensive to be commercially attractive as it involves solvent separation and other steps.

Another attempt to solve the problem of intractability appurtenant to known polyimides involves the formation of a copolyimide from an aromatic tetracarboxylic acid and two aromatic diamines, one of which also has an aliphatic moiety.[2] While such copolymers have the desired thermoplasticity, they also have markedly inferior thermal stabilities because of the presence of the aliphatic moiety and accordingly lack one of the very characteristics which make aromatic polyimides of such great potential value.

I have now discovered certain novel aromatic thermoplastic copolyimides that do not have the above-discussed disadvantages of the previously proposed solutions to the problem of the intractability of aromatic polyimides. They have exceptionally high thermal stability and can be coalesced at pressures which are markedly lower than those required to coalesce the molding powders described above. And the procedure by which they are made is decidedly less expensive than those by which the polymeric materials discussed above are prepared. In a preferred method these novel aromatic copolyimides are prepared from monomeric resinoids which are solid state solutions of a 3,3′,4,4′-benzophenonetetracarboxylic acid derivative and aromatic diamines which are free of aliphatic moieties. At least one of the diamines must be meta-substituted, and any diamines which are not meta-substituted must be para-substituted. Also, the imide-forming functionalities (the amino and carboxylic moieties) should be present in substantially equimolar amounts.

The monomeric precursors are prepared by dissolving 3,3′,4,4′-benzophenonetetracarboxylic acid dianhydride in an excess of an esterifying reagent and solvent such as ethanol followed by addition of the aromatic diamines, which are allowed to dissolve in the excess ethanol.[3] The solvent is then removed, leaving an amorphous unreacted resinoid which has high solubility in low boiling solvents and also has a long shelf life for the reasons discussed in more detail in U.S. Pat. No. 3,506,583 issued Apr. 14, 1970, to William R. Boram and myself for Monomeric, Solid State Solutions of Certain Aromatic Diamines in Derivatives of Benzophenonetetracarboxylic Acid, which is hereby incorporated by reference herein.

The solid state solutions or resinoids thus prepared can be converted to the corresponding copolyimides by heating them first to a temperature in the range of about 125° to about 150° C., which produces a foam. This foam is ground and the resulting particulate material heated to a temperature in the range of 300° to 325° C. until it is fully cured; i.e., converted to polyimide. In air the formation of the polyimide will proceed to completion in 8–12 hours at 300° C., in 5–6 hours at 315° C., and in 2–4 hours at 325° C.

Temperatures higher than 325° C. in air produce discoloration and decomposition of the resin, while temperatures lower than 300° C. produce incomplete polymerization. Both conditions result in molded objects with poor surface characteristics.

The cured polymer can then be placed in a mold and caused to flow at a temperature of ca. 328° C. or higher under moderate pressures (ca. 800 p.s.i. or higher). This temperature is well below the degradation temperature of the polymer.

One advantage of the novel method of producing a polyimide just described is that the use of costly solvents is avoided. Another advantage is that the polymerization reaction requires only a simple heating cycle.

Another advantage of the present invention is that no chemical reactions occur in the molding step. Accordingly, there is no evolution of solvents or reaction products in the molding step. This permits the fabrication of dense, void-free structures.

Also, the preparation of a polymeric precursor, as is required in the application of most of the previously

---

[1] U.S. Pat. No. 3,422,064 issued Jan. 14, 1969, to W. G. Gall for Aromatic Polyimide Preparation.
[2] U.S. Pat. No. 3,424,718 issued Jan. 28, 1969, to R. J. Angelo for Copolymers of Aromatic Tetracarboxylic Acids With at Least Two Organic Diamines.
[3] Other alkyl alcohols including methyl, propyl, and isopropyl can be used as the esterifying agent-solvent although ethanol is in many cases preferred because of its widespread availability, low cost, and other attributes. Changing the alkyl group of the esterifying agent merely affects the curing rate of the product and properties associated with the resinout nature of the material such as tackiness, drying time, etc.

known polyimides, is eliminated since the polyimide can be formed directly from the monomeric resinoid. The novel systems disclosed herein also have a number of advantages attributable to the properties of the monomeric precursor as described in Pat. No. 3,506,583.

In the method described in the preceding paragraph the particulate material is for the most part converted directly from the monomer to the copolyimide without going through the copolyamic acid intermediate, and such intermediate as may be formed is not isolated. For applications such as molding, this method of preparing the copolyimide is preferable for the reasons discussed previously. However, in other application such as surface coating, the use of a polymeric precursor may be advantageous. In such circumstances the diamines and acid derivative are heated in a solvent such as N,N'-dimethylformamide to a temperature of from 100 to 200° C. until polymerization occurs.

Temperatures lower than 100° C. will not produce copolyamic acid intermediates in solvents in any appreciable yield, while temperatures higher than 200° C. will initiate the final condensation polymerization and result in the formation of copolyimide. This must be avoided because it impairs the solubility of the product in solvents.

The particular temperature selected for the formation of the copolyamic acid intermediate will depend mostly upon the esterifying agent which is used.

The polymeric intermediate formed in the manner just described may be isolated via precipitation in water followed by filtration.

In conjunction with the foregoing, in another method of preparing the novel copolyimides described herein, the solution of diamines and tetracarboxylic acid derivative is heated in a solvent such as N,N'-dimethylformamide to reflux temperature until polymerization occurs. The polymer is then separated from the solvent in the manner described in the preceding paragraph. In these circumstances the isolated polymer is the copolyimide.

The thermoplasticity of the novel copolyimides described above is attributable to randomness in the distribution of the mesomers (repeating units) in the polymer chain. More specifically, in a homopolyimide, there is regularity of the mesomers since homopolyimides have the structure:

[Mesomer]$_x$ where $x$ is the number of times the unit is repeated. Such polymers are therefore inflexible and crystalline, as a result of which their transition temperatures are so high that extensive oxidation occurs in molding them. Accordingly, such polymers cannot be thermoformed.

In contrast, by using more than one diamine component, I have introduced an element of randomness into the polymer chain. This markedly reduces the degree of crystallinity in my novel copolyimides in comparison to that observed in the heretofore known aromatic homopolymers.

More particularly, copolymers have as many different repeating units as there are combinations of mesomer-forming reactants. Copolymers are represented as follows:

[Mesomer A]$_x$, [Mesomer B]$_y$, etc.

If the reaction of the components is random, $x$ and $y$ are different; and the chain is characterized by a random distribution of the mesomers involved. As suggested above, this results in a lower degree of crystallinity. The reduction in crystallinity lowers the transition temperature of the polymer below its degradation temperature, permitting it to be thermoformed by the same techniques as used on other thermoplastic materials. At the same time there is no loss of thermal stability as in the "prior art" systems discussed above since, in contrast to such systems, there is no introduction of aliphatic moieties into the chain (polymers containing aliphatic moieties are thermally and oxidatively sensitive).

As will become apparent hereinafter, as few as two diamines may be employed in the novel copolyimides of the present invention. However, it is for some applications preferred that three or more diamines be used and that at least two of these be meta-substituted. Also, if a rigid polymer is desired, at least one para-substituted diamine is employed.

In addition to those discussed above, the novel aromatic copolyimides of the present invention have the advantage over other aromatic polyimides including the copolyimides discussed in the Angelo patent that they can be made without the formation of a polymeric precursor. This is important because the polymeric precursors referred to above have extremely short shelf lives, even at room temperature.

Also, in conjunction with the foregoing, the polymeric precursors of heretofore known aromatic polyimides are necessarily always prepared from tetracarboxylic acid dianhydrides and diprimary diamines in solvents such as N,N'-dimethylacetamide and N,N'-dimethylformamide, which are quite costly. Furthermore, the process for the conversion of the polymeric intermediates into the final products involves the generation of volatile materials (the solvent and the condensation products) which become trapped and produce a polymer that contains voids. This is of course undesirable, especially where maximum structural strength is required.

By contrast, the thermoplastic copolyimides of the present invention can be prepared in inexpensive solvents such as ethanol. Also, they do not generate volatiles when they are shaped, permitting them to be formed into dense, void-free articles.

Copolyimides made from 3,3',4,4'-benzophenonetetracarboxylic acid-diethyl ester, 2,6-diaminopyridine, 3,3'-diamino-diphenylsulfone, and 4,4'-diaminodiphenylsulfone with the imide-forming functionalities of the diamine and the dicarboxylic acid derivative present in substantially equimolar amounts are preferred for many applications. These particular polyimides form stable monomeric precursors which have long shelf lives and the system lends itself to a very economical process of preparation. However, for other applications, systems containing different and both a smaller and greater number of diamines may instead be employed.

In any event, it is preferred (though not essential) that the diamines employed be selected from those which have primary amine base disassociation constants lower than $10^{-10}$ (all three of those listed above have primary amine base disassociation constants on the order of $10^{-12}$). This criterion is important from an economic point-of-view since precursors having more reactive amines do not have long shelf lives. In such systems the amino groups of the monomers react rapidly with atmospheric oxygen and the carboxylic acid groups of the monomers, even at room temperature. Such reactions make the monomeric material useless.

Also, in systems employing more reactive amines, the precursor must be polymerized in an oxygen-free environment (i.e., in a solvent and/or an inert atmosphere such as argon); or the amino groups will be oxidized, resulting in termination of the chains at very short lengths. Such a polymerization process is of course expensive and therefore undesirable from a commercial point-of-view[4].

In contrast to those just mentioned, the preferred precursors of the present invention are not appreciably subject to oxidative degradation, even during the curing cycle. Accordingly, they have long shelf lives and can be polymerized simply by heating them in air, which is a comparatively inexpensive step to perform.

Notwithstanding the foregoing more reactive diamines can be employed in the monomeric precursors

---

[4] Another characteristic of systems employing more reactive diamines, which may also be considered undesirable, is that the polymers are much darker than those of the preferred systems.

of the present invention where other considerations outweigh the advantages of long shelf life and processability in air. Illustrative of the aromatic meta- and para-substituted diamines which may be employed instead of or in combination with one or more of the less reactive diamines referred to above in such circumstances are:

3,3'-diaminodiphenyl ether
4,4'-diaminodiphenyl ether
p-Phenylenediamine
m-Phenylenediamine
4,4'-bisoxyaniline The resinoids of this invention are useful in the preparation of foam structures in addition to the dense, void-free structures described above. To form a foam the monomeric resinoid precursor is heated in the absence of solvents from room temperature to on the order of 300° to 325° C.

If the diamines have primary amine base disassociation constants not exceeding $10^{-10}$, the resinoid can be heated in air. If a more reactive diamine is present, the heating step must be carried out in a non-oxidizing environment.

The materials obtained are low density copolyimide foams, which are highly resilient [5,6] and have uniform cell size. These foams are useful as acoustical, thermal, and electrical insulators at high temperatures. In addition, they are useful in radar structures because of their transparency characteristics at radar frequencies.

The resinoids described herein are also useful in other applications. For example, they can be used in solution for impregnation purposes and in the absence of solvents for the fabrication of composites.

From the foregoing it will be apparent that one important and primary object of the present invention resides in the provision of novel copolyimides which have the advantages of known aromatic homopolyimides such as chemical inertness, high strength, resistance to high temperature, etc. and which, in addition, are thermoformable.

A further important and primary object of the invention is the provision of novel copolyimides which are inexpensive to prepare and which are made from precursors having long shelf lives.

Another important and primary object of the present invention is the provision of novel precursors which can be converted simply by heating into resilient copolyimide foams.

Yet other important, primary objects of this invention reside in the provision of novel monomeric, resinoid-like copolyimide precursors and in the provision of novel methods for preparing such precursors and for converting the precursors into thermoformable copolyimides, into resilient compolyimide foams, and into copolyamic acid precursors of the copolyimides.

Other objects and advantages and additional novel features of the present invention will be apparent to those skilled in the relevant arts from the foregonig general description of the invention, from the appended claims, and from the following examples, which are intended to illustrate and not restrict the scope of the invention.

EXAMPLE I 3,3',4,4'-benzophenonetetracarboxylic acid dianhydride (32.22 g., 0.10 M) was dissolved in 125 mls. of ethanol to convert it to the diester. 2,6-pyridinediamine (4.37 g., 0.04 M), 3,3'diaminodiphenylsulfone (9.93 g., 0.04 M), and 4,4'-diaminodiphenylsulfone 4.97 g., 0.02 M) and 125 mls. of ethanol were added to the diester solution

---

[5] Desirable foams can be made from precursors having only two diamines. For foams having maximum resilience, two meta-substituted diamines are employed. One para-substituted diamine and one meta-substituted diamine are used if a less resilient foam is desired.
[6] Resilient foams cannot be made from homopolyimides because of the regularity of the polymer chain. As discussed above, this makes them crystalline and relatively inflexible.

at room temperature. The mixture was stirred and heated until all solids were dissolved (30 minutes at approximately 30° C.). The solution was filtered by gravity, and the solvent was removed in a rotary evaporator and later in a vacuum oven at 78° C. The resulting foam was powdered and vacuum dried for one hour at 80° C., producing a monomeric resinoid powder.

The monomeric resinoid thus produced was found to have a long shelf life. It remained a free-flowing powder after storage for four months. Also, it remained highly soluble in ethanol and acetone.

EXAMPLE II

The resinoid of Example I was heated in a circulating air oven from room temperature to 150° C. in ten minutes. A foam structure was formed, and this was homogeneous, of even cell size, and bright yellow. This foam was powdered and heated in air at 315° C. for ten hours. The resulting powder was finely ground, placed in a steel die and heated to 330° C. under 900 p.s.i. After 30 minutes, the sample was cooled and removed from the die. A transparent reddish pellet of material was obtained. This material had a Rockwell Hardness (B Scale) of 73 and a density of 1.4 g./cm.$^3$. This was a surprising result since most polyimides have a Rockwell B Hardness of about 5.

EXAMPLE III

A monomeric resinoid was prepared by the procedure described in Example I but using only two diamines. Specifically, 3,3',4,4'-benzophenonetetracarboxylic acid dianhydride (32.22 g., 0.10 M) was dissolved in 150 mls. of ethanol to convert it to the diester. 2,6-pyridinediamine (5.46 g., 0.05 M) and 4,4-diaminodiphenylsulfone (12.42 g., 0.05 M) were added along with 100 mls. of ethanol. The mixture was stirred and heated until homogeneous (at about 40° C.) and then filtered by gravity. The solvent was removed under reduced pressure, resulting in a resinoid similar to that obtained in Example I.

This resinoid was placed on a ceramic brick in an oven in air at 315° C. After 15 minutes, a foam structure was obtained. This structure was resilient, of low density (approximately 0.03 gm./cm.$^3$), and light yellow in color. This material had an open cell structure and was found useful as an acoustical insulation.

EXAMPLE IV

The resinoid of Example III was powdered and mixed with aluminum powder in a 4:1 ratio by weight. The mixture was heated to 315° C. This produced a foam structure in which the aluminum was homogeneously dispersed.

Lead, copper, asbestos, silica, boron and tin powders were used as fillers with similar results. Other materials may be added as required to produce combinations with specific properties and applications.

EXAMPLE V

The resinoid of Example I was cured as described in Example II. The cured copolyimide powder was mixed with boron fibers, placed in a mold, and pressed at 330° C. under 850 to 1000 p.s.i. The material formed a pellet which was transparent and in which the boron fibers could be seen.

EXAMPLE VI 2,6-pyridinediamine (4.37 g., 0.04 M), 3,3'-diaminodiphenylsulfone, (9.93 g., 0.04 M), and 4,4'-diaminodiphenylsulfone (4.96 g., 0.02 M) were added to 200 g. of polyphosphoric acid in a round bottom flask. The mixture was stirred and heated to 60° C.; and, when it had become homogeneous, it was cooled to 30° C. 3,3',4,4'-benzophenonetetracarboxylic acid dianhydride (32.22 g., 0.10 M) was then added, and the mixture was heated at 230° C. until it became homogeneous.

The reaction mixture was cooled to approximately 80° C. and added to 3 l. of distilled water. The resulting solids were isolated by filtration, washed three times with distilled water, and then three times with reagent ethanol. The polymer thus obtained was dried and heated to 315° C. for 5 hours.

A portion of this polymer was placed in a mold and subjected to 800 p.s.i. of pressure at 330° C. for 10 minutes. The polymer was found to flow under these conditions.

EXAMPLE VII

The following diamines were added to 200 gms. of polyphosphoric acid as in Example VI.

| | | |
|---|---|---|
| m-Phenylenediamine | 3.24 grams | 0.03 M |
| 2,6-diaminopyridine | 3.27 grams | 0.03 M |
| 4,4'-diaminodiphenylsulfone | 4.97 grams | 0.02 M |
| 4,4'-bisoxyaniline | 4.00 grams | 0.02 M |

The reaction mixture was stirred at 60° C. and then cooled to 30° C. Benzophenonetetracarboxylic acid dianhydride (32.22 g., 0.10 M) was then added and the mixture heated to 260° C. This produced a polymer which was isolated and washed as in Example VI and found to flow under temperature-pressure conditions similar to those described in Example VI.

EXAMPLE VIII

The following diamines were dissolved in 250 mls. of N,N'-dimethylformamide in an inert atmosphere:

| | | |
|---|---|---|
| m-Phenylenediamine | 4.32 grams | 0.04 M |
| 2,6 diaminopyridine | 4.37 grams | 0.04 M |
| 4,4'-bisoxyaniline | 4.00 grams | 0.02 M |

When the mixture became homogeneous it was cooled to 15° C. 3,3',4,4'-Benzophenonetetracarboxylic acid dianhydride (32.22 g., 0.10 M) was added and stirred until it dissolved as the mixture was allowed to come to room temperature. The mixture was then heated to reflux temperature, cooled, and poured into 2 l. of water. This formed a polymer which was isolated by vacuum filtration and washed repeatedly with water and ethanol. The polymer was then dried and heated to 315° C. in argon.

A sample of this polymer was pressed at 330° C. and approximately 1,000 p.s.i. and found to flow in the same manner as the material described in Example II.

In the foregoing example the polymer isolated from the N,N'-dimethylformamide solvent was a mixture of the copolyimide and the corresponding copolyamic acid intermediate. Had it been desired to recover the material in the form of the intermediate rather than as a mixture of the intermediate and copolyimide, the diamine-dianhydride mixture would have been heated to a lower temperature (on the order of 100° C.) rather than to reflux temperature.

As discussed previously, copolyimides employing three polyimides are preferred for some applications of the present invention. However, if desired, two, or more than three, diamines may also be used where circumstances warrant.

EXAMPLE IX 3,3',4,4'-benzophenonetetracarboxylic acid dianhydride (32.23 g. 0.10 M) was added to 150 mls. of reagent ethanol. The mixture was heated and refluxed until the solids were dissolved. 2,6-diaminopyridine (5.45 g., 0.05 M) and 3,3'-diaminodiphenylsulfone (24.81 g., 0.05 M) were added to the mixture at room temperature along with 100 ml. of ethanol. The mixture was stirred and heated to about 40° C. until the solids dissolved. The solution was then filtered and the solvent removed under reduced pressure at temperatures up to 71° C. The resulting material was powdered and dried overnight. Then it was polymerized in an argon atmosphere by heating to 150° C. The polymeric material was ground and heated to 308° C., producing a copolyimide which was caused to flow in a mold at 328° C. and 900 p.s.i. The molded part was transparent and quite flexible and had a density of 1.4 g./cm.$^3$.

EXAMPLE X 3,3',4,4'-benzophenonetetracarboxylic acid dianhydride (32.23 g., 0.10 M) was dissolved in ethanol as in the previous example. 4,4'-bisoxyaniline (2 g., 0.01 M), 2,6-diaminopyridine (4.37 g., 0.04 M), 4,4'-diaminodiphenylsulfone (9.92 g., 0.04 M), and 3,3'-diaminodiphenylsulfone (2.48 g., 0.01 M) were dissolved in the diester solution as in the previous example. The solution was filtered, and the solvent was removed under reduced pressure. The precursor thus recovered was heated to effect polymerization in an inert, argon atmosphere; and the resulting copolymer was caused to flow in a mold at 328° C. and 900 p.s.i. The molded disc obtained was somewhat darker but otherwise similar to that obtained in the previous example.

The foregoing example also demonstrates that diamines having primary amine base disassociation constants exceeding 10$^{-10}$ may be employed in the practice of the present invention if polymerization is effected in an inert atmosphere.

The materials produced by the procedures described in Examples II–X above were determined in each case to be a copolyimide by infrared spectrometry. In each instance imide bonds were present in the spectra and amide bonds were absent. Also, in each case, the material was caused to flow without evidence of degradation.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed and desired to be secured by Letters Patent is:

1. A copolyimide obtained by heating to a temperature of from 300 to 325° C. an alkyl diester of 3,3',4,4'-benzophenonetetracarboxylic acid and at least two aromatic diamines which are free of aliphatic moieties, the ratio of the imide forming functionalities being substantially equimolar, at least one of said diamines being meta-substituted, any diamines which are not meta-substituted being para-substituted, and said copolyimide having a random distribution of dissimilar recurring units.

2. A copolyimide according to claim 1, wherein at least one of the diamines is para-substituted.

3. A copolyimide according to claim 1, which is the product of at least three diamines, at least two of said diamines being meta-substituted.

4. A copolyimide according to claim 1, wherein the diamines are selected from those having primary amine base disassociation constants not exceeding about 10$^{-10}$.

5. A copolyimide according to claim 1, wherein the diamines are or are selected from or include 2,6-diaminopyridine, 3,3'-diaminodiphenylsulfone, and 4,4'-diaminodiphenylsulfone.

6. A copolyimide according to claim 1, wherein the alkyl diester is a methyl, ethyl, propyl, or isopropyl diester of 3,3',4,4'-benzophenonetetracarboxylic acid.

7. A polyimide according to claim 6, wherein the alkyl diester is an ethyl diester of 3,3',4,4'-benzophenonetetracarboxylic acid.

8. The process of making a molded article of specified shape by subjecting to a pressure of at least 800 p.s.i. at a temperature of at least ca. 328° C. a copolyimide as defined in claim 1.

9. The process of preparing a thermoplastic copolyimide having a random distribution of dissimilar recurring units by heating to a temperature of from 300 to 325° C. a substantially monomeric, resinoid-like material which is essentially a solid state solution of an alkyl diester of 3,3',4,4'-benzophenonetetracarboxylic acid and at least two aromatic diamines, at least one of said diamines being meta-substituted, any diamines which are not meta-substituted being para-substituted, and the ratio of the imide forming functionalities being substantially equimolar.

10. The process of claim 9, wherein at least one of the diamines has a primary amine base disassociation constant of at least $10^{-10}$ and wherein the heating of the tetracarboxylic acid ester and the diamines is carried out in a substantially oxygen-free environment.

11. The process of claim 9, wherein all of said diamines have primary amine base disassociation constants not exceeding $10^{-10}$ and wherein the heating of the tetracarboxylic acid diester and the diamines is carried out in air.

12. The process of claim 9, wherein the diamines are or are selected from or include 2,6-diaminopyridine, 3,3'-diaminodiphenylsulfone, and 4,4' - diaminodiphenylsulfone.

13. The process of claim 9, wherein the alkyl diester is a methyl, ethyl, propyl, or isopropyl diester of 3,3',4,4'-benzophenonetetracarboxylic acid.

14. The process of claim 13, wherein th alkyl diester is an ethyl diester of 3,3',4,4'-benzophenonetetracarboxylic acid.

15. The process of preparing a particulate, thermoplastic, copolyimide material which is shapeable into useful articles by preparing a solid state solution of an alkyl diester of 3,3',4,4'-benzophenonetetracarboxylic acid and at least two aromatic diamines which are free of aliphatic moieties, at least one of said diamines being meta-substituted, any diamines which are not meta-substituted being para-substituted, and the ratio of the imide forming functionalities being substantially equimolar; converting the solid state solution to a foamed, particulate material by heating it to a temperature in the range of about 125–150° C.; and curing said material by heating it to a temperature in the range of 300 to 325° C.

16. The process of claim 15, wherein the diamines are selected from those having primary amine base disassociation constants not exceeding $10^{-10}$.

17. The process of claim 15, wherein the alkyl diester is a methyl, ethyl propyl, or isopropyl diester of 3,3',4,4'-benzophenonetetracarboxylic acid.

18. The process of making a molded article by preparing a solid state solution of an alkyl diester of 3,3',4,4'-benzophenonetetracarboxylic acid and at least two aromatic diamines which are free of aliphatic moieties, at least one of said diamines being meta-substituted, any diamines which are not meta-substituted being para-substituted, and the ratio of the imide forming functionalities being substantially equimolar; foaming said solution by heating it to a temperature in the range of 125 to 150° C.; reducing the foam to a particulate form; curing the resulting particulate material by heating it to a temperature in the range of 300 to 325° C.; and subjecting the cured particulate material to a pressure of at least 800 p.s.i. and a temperature of ca. 328° C. or higher to form the desired article.

19. The process of claim 15, wherein the diamines are selected from those having primary amine base disassociation constants not exceeding $10^{-10}$.

20. The process of claim 15, wherein the alkyl diester is a methyl, ethyl, propyl, or isopropyl diester of 3,3',4,4'-benzophenonetetracarboxylic acid.

21. The process of producing a resilient, low density copolyimide foam by preparing a solid state solution of an alkyl diester of 3,3',4,4'-benzophenonetetracarboxylic acid and at least two aromatic diamines, at least one of said diamines being meta-substituted, any diamines which are not meta-substituted being para-substituted, and the ratio of the imide forming functionalities being substantially equimolar; and heating said solid state solution in the absence of solvents to a temperature in the range of 300 to 325° C.

22. The process of claim 21, wherein the diamines are selected from those having primary amine base disassociation constants not exceeding $10^{-10}$.

23. The process of claim 21, wherein the alkyl diester is a methyl, ethyl,propyl, or isopropyl diester of 3,3',4,4'-benzophenonetetracarboxylic acid.

24. A foamed body of a copolyimide having a random distribution of dissilimar recurring units and obtained by heating in the absence of a solvent to a temperature of from 300 to 325° C. an alkyl diester of 3,3',4,4'-benzophenonetetracarboxylic acid and at least two different aromatic diamines which are free of aliphatic moieties, at least one of said diamines being meta-substituted, all of the diamines being either meta- or para-substituted, and the ratio of the imide forming functionalities being substantially equimolar.

25. The foamed body of claim 24, wherein the diamines are selected from those having primary amine base disassociation constants not exceeding $10^{-10}$.

26. The foamed body of claim 24, wherein the alkyl diester is a methyl, ethyl, propyl, or isopropyl diester of 3,3',4,4'-benzophenonetetracarboxylic acid.

27. A copolyamic acid intermediate obtained by heating to a temperature of from 100 to 200° C. a solution of an alkyl diester of 3,3',4,4'-benzophenonetetracarboxylic acid and at least two aromatic diamines which are free of aliphatic moieties, the ratio of the imide forming functionalities being substantially equimolar, at least one of said diamines being meta-substituted, any diamines which are not meta-substituted being para-substituted, and said intermediate having a random distribution of dissimilar recurring units.

28. A copolyamic acid intermediate according to claim 27, wherein the diamines are selected from those having primary amine base disassociation constants not exceeding $10^{-10}$.

29. The copolyamic acid intermediate of claim 27 wherein the alkyl diester is a methyl, ethyl, propyl, or isopropyl diester of 3,3',4,4'-benzophenonetetracarboxylic acid.

30. The process of preparing a polyamic acid intermediate having a random distribution of dissimilar recurring units by heating to a temperature of from 100° to 200° C. in a solvent an alkyl diester of 3,3',4,4'-benzophenonetetracarboxylic acid and at least two aromatic diamines, at least one of said diamines being meta-substituted, any diamines which are not meta-substituted being para-substituted, and the ratio of the imide forming functionalities being substantially equimolar.

31. The process of claim 30, wherein the diamines are selected from those having a primary amine base disassociation constant not exceeding $10^{-10}$.

32. The process of claim 30, wherein the alkyl diester is a methyl, ethyl, propyl, or isopropyl diester of 3,3',4,4'-benzophenonetetracarboxylic acid.

References Cited
UNITED STATES PATENTS

| | | | |
|---|---|---|---|
| 3,391,120 | 7/1968 | Fritz | 260—63 |
| 3,410,826 | 11/1968 | Endrey | 260—47 |
| 3,422,061 | 1/1969 | Gall | 260—47 |
| 3,424,718 | 1/1969 | Angelo | 260—47 |
| 3,483,144 | 12/1969 | Lavin et al. | 260—2.5 |
| 3,506,583 | 4/1970 | Boram et al. | 252—188.3 |
| 3,511,790 | 5/1970 | DeBrunner et al. | 260—2.5 |

LESTER L. LEE, Primary Examiner

U.S. Cl. X.R.

260—37 N, 47 CP, 65, 78 TF; 264—51